United States Patent
Kagata et al.

(10) Patent No.: US 6,258,462 B1
(45) Date of Patent: Jul. 10, 2001

(54) DIELECTRIC CERAMIC COMPOSITION AND DEVICE FOR COMMUNICATION APPARATUS USING THE SAME

(75) Inventors: Hiroshi Kagata, Osaka; Hidenori Katsumura, Hyogo, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/286,815

(22) Filed: Apr. 6, 1999

(30) Foreign Application Priority Data

Apr. 13, 1998 (JP) .................................................. 10-101308

(51) Int. Cl.[7] ............................. C04B 35/10; B32B 17/00
(52) U.S. Cl. ......................... 428/469; 428/432; 501/119; 501/152; 501/153
(58) Field of Search .................................. 428/469, 699, 428/432, 702; 501/119, 152, 153

(56) References Cited

U.S. PATENT DOCUMENTS 5,350,639 * 9/1994 Inoue et al. .

FOREIGN PATENT DOCUMENTS 0 582 274 A1    2/1994 (EP) .
60-21854    *    7/1983 (JP) .

* cited by examiner

Primary Examiner—Deborah Jones
Assistant Examiner—Jennifer McNeil
(74) Attorney, Agent, or Firm—Merchant & Gould P.C.

(57) ABSTRACT

A dielectric ceramic composition used in a high frequency band such as microwave or millimeter wave, etc., and having a low dielectric constant, low loss and small absolute value of the temperature coefficient at resonance frequency. The dielectric ceramic composition comprises $Al_2O_3$, MgO and $RO_n$. The $Al_2O_3$, MgO and $RO_n$ are expressed by a composition formula: $xAlO_{3/2}$—$YMgO$—$zRO_n$ (R is at least one element selected from La, Ce, Pr, Nd, Sm, Eu, Gd and Tb; and n is a value stoichiometrically determined in accordance with the valence of the R), wherein $x \geq 55$, $y \geq 0.5$, $z \geq 0.5$ and $x+y+z=100$. A dielectric ceramic comprising a crystal phase and a glass phase also is provided. The crystal phase includes a magneto-plumbite phase that includes $Al_2O_3$.

18 Claims, 2 Drawing Sheets

DIELECTRIC CERAMIC COMPOSITION AND DEVICE FOR COMMUNICATION APPARATUS USING THE SAME

FIELD OF THE INVENTION

The present invention relates to a dielectric ceramic composition useful for a device used as a resonator, a filter, an antenna, a capacitor, an inductor, a circuit board or the like in a highly frequency band such as microwave, millimeter wave, etc. The present invention also relates to a device for a communication apparatus including such a dielectric ceramic composition.

BACKGROUND OF THE INVENTION

Recently, dielectric ceramics have been used widely as filter materials for communication apparatus with the spread of mobile communication. Such dielectric ceramics are required to have a high dielectric constant ($\epsilon_r$), a low dielectric loss (tan δ), i.e. a high Q value that is an inverse number of the dielectric loss, and a small absolute value of the temperature coefficient at resonance frequency (TCF).

It is predicted that the frequency of communication systems will become higher and the shorter wavelength of the radio wave will be used. Therefore, when machining accuracy and conductor loss are taken into consideration, dielectrics having a low dielectric constant increasingly will be demanded. Conventional examples of a dielectric ceramic composition having a low dielectric constant include $MgTiO_3$—$CaTiO_3$ based dielectric ceramic compositions, $Al_2O_3$ based dielectric ceramic compositions or the like (disclosed in, for example, Japanese Patent Publication (Tokkai Hei) No. 6-92727). Furthermore, as the dielectric ceramic composition that has a low dielectric constant and can be sintered simultaneously with a conductor such as Ag having high conductivity at low temperature of 1100° C. or less, a composition in which glass is added to $Al_2O_3$ is well known.

However, in the $MgTiO_3$—$CaTiO_3$ based dielectric ceramic composition, the loss is low and the TCF is close to zero, but the dielectric constant is as high as about 20. Furthermore, in the $Al_2O_3$ based dielectric ceramic composition, the loss is low and the dielectric constant is as small as about 10, but the TCF has a large negative value. Similarly, in the composition in which glass is added to $Al_2O_3$, the dielectric constant is as small as 10 or less, but the TCF has a large negative value. From such circumstances, dielectric ceramic compositions having a dielectric constant lower than that of the $MgTiO_3$—$CaTiO_3$ based composition and a practical level of loss and TCF, and dielectric ceramic compositions having a dielectric constant as high as that of the composition in which glass is added to $Al_2O_3$ and a TCF closer to zero have been demanded.

SUMMARY OF THE INVENTION

It is therefore an object of the present invention to provide a dielectric ceramic composition having a low dielectric constant, low loss and further a small absolute value of the temperature coefficient at resonance frequency (TCF), and to provide a device for communication apparatus using the dielectric ceramic composition and suitably used in a high frequency band such as millimeter wave, microwave, etc.

In order to achieve the object, the dielectric ceramic composition of the present invention comprises $Al_2O_3$, MgO and $RO_n$. The $Al_2O_3$, MgO and $RO_n$ are expressed by a composition formula: $xAlO_{3/2}$—$yMgO$—$zRO_n$, where $x \geq 55$, $y \geq 0.5$, $z \geq 0.5$ and $x+y+z=100$.

Herein, R is at least one element selected from La, Ce, Pr, Nd, Sm, Eu, Gd and Tb; and n is a value stoichiometrically determined in accordance with the valence of the selected R. The n is expressed by m/2 when the valence of R is m. For example, when the valence of R is 3, n is 3/2; and when the valence of R is 4, n is 2.

Such a dielectric ceramic composition makes it possible to produce various kinds of devices having a low dielectric constant, low loss and yet a small absolute value of the temperature coefficient at resonance frequency (TCF). It is preferable that the dielectric ceramic composition comprises the component expressed by the above-mentioned composition formula as a main component.

On the other hand, the dielectric ceramic composition can be used in a form in which a glass composition is added. In this case, it is preferable that the dielectric ceramic composition comprises a glass composition containing at least one selected from $SiO_2$ and $B_2O_3$ in an amount of 70 weight % or less as a second component in addition to the first component expressed by the above-mentioned composition formula. Furthermore, it is preferable that the second component comprises at least one oxide selected from $Al_2O_3$, $ZrO_2$, $TiO_2$, BaO, SrO, CaO, MgO, $La_2O_3$, PbO, ZnO, $Li_2O$, $Na_2O$ and $K_2O$.

More specifically, it is preferable that the second component has any of the below mentioned compositions I to III. Moreover, % given herein means weight %.

[Composition I] $SiO_2$: 20 to 70%, $B_2O_3$: 0 to 35%, $Al_2O_3$: 1 to 35%, MO: 0 to 50%

[Composition II] $SiO_2$: 30 to 60%, $B_2O_3$: 2 to 8%, $Al_2O_3$: 2 to 10%, MO: 20 to 50%, $La_2O_3$: 5 to 15%

[Composition III] $SiO_2$: 30 to 70%, $B_2O_3$: 10 to 35%, $Al_2O_3$: 5 to 30%, MO: 2 to 15%, $ZrO_2$: 0.5 to 13%

In the above, M is at least one element selected from Ca, Sr and Ba.

Moreover, the R is preferably at least one element selected from La, Nd and Sm, although it is not limited thereto. Furthermore, x, y and z in the above-mentioned composition formula are preferably in the ranges: $65.0 \leq x \leq 98.5$, $1.5 \leq y \leq 30.0$ and $1.5 \leq z \leq 35.0$.

Furthermore, it is preferable that the dielectric composition comprises a crystal phase comprising the first component and a glass phase comprising the second component. It is further preferable that the crystal phase comprises a magneto-plumbite phase and the magneto-plumbite phase comprises $Al_2O_3$.

With the foregoing in mind, according to another aspect of the present invention, the dielectric ceramic composition comprises a crystal phase and a glass phase. The crystal phase comprises a magneto-plumbite phase and the magneto-plumbite phase comprises $Al_2O_3$.

Furthermore, it is preferable that the crystal phase comprises at least one phase selected from a corundum phase, a spinel phase, a trydimite phase, a cristobalite phase and a perovskite phase. Furthermore, as mentioned above, it is preferable that the composition contains MgO, RO, and at least one selected from $SiO_2$ and $B_2O_3$. R and n herein are the same as in the above.

According to another aspect of the present invention, a device for communication apparatus of the present invention comprises the dielectric ceramic composition. This device is suitably used in a GHz band, in particular, microwave, millimeter wave, etc. Furthermore, the device is constituted appropriately in combination with a metal conductor. For example, the above-mentioned dielectric ceramic composition is laminated to one or more metal conductors, which is used as a laminated device. This laminated device preferably comprises a dielectric layer comprising the dielectric ceramic composition and a conductive layer comprising at least one metal selected from Ag, Au, Cu and Pd as a main component. Examples of the devices of the present invention include a dielectric filter, a dielectric resonator, a dielectric antenna, a capacitor, an inductor and a circuit board or the like.

DETAILED DESCRIPTION OF THE INVENTION

Figure 1:
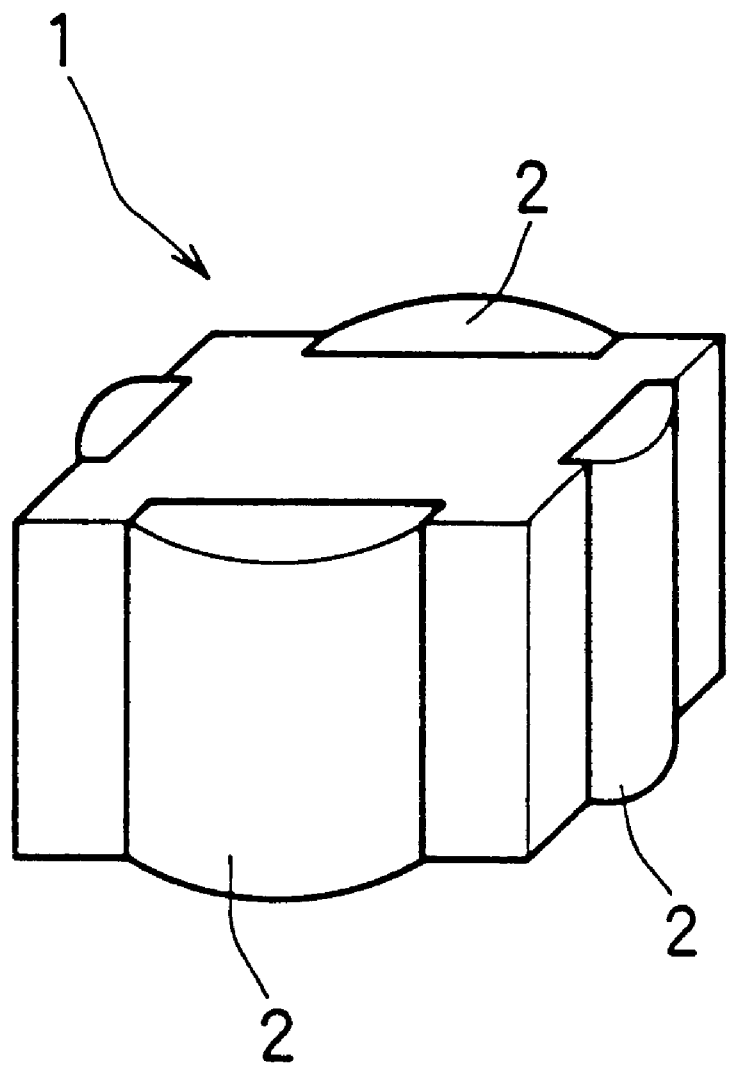
FIG. 1 is an outside perspective view showing one example of a device for communication apparatus of the present invention.

Hereinafter, examples of methods for obtaining a molded body comprising the dielectric ceramic composition of the present invention will be described.

As starting materials for producing the dielectric ceramic composition of the present invention, oxide, carbonate, nitrate and organometallic salt or the like of each component element are used. The purity of 99% or more is preferred, although it is not limited thereto. These materials are weighed so that the amount thereof is in the above-mentioned composition ranges, and mixed. The mixing is carried out in a ball mill, a medium stirring mill, a mortar or the like. Any of wet mixing and dry mixing may be employed. In the case of the wet mixing, water, alcohol, ether or the like can be used as the solvent. If necessary, the dried mixture is thermally treated in a melting pot. The melting pot made of mullite, alumina, platinum or the like is preferred. The temperature for the thermal treatment is preferably in the range from 800 to 1500° C.

In order to obtain a glass phase, the molten material is quenched. The quenching can be carried out by, for example, a method of dripping materials melted by heating into water, a method of dripping the materials onto a metal plate, or the like. The obtained thermally treated materials are ground by the same method as the above-mentioned mixing. In grinding, if necessary, drying may also be carried out. Thus, the dielectric crystalline powder and/or glass powder is obtained. If necessary, the dielectric crystalline powder and glass powder are mixed and dried by the same method as the above-mentioned mixing.

Next, the obtained powders are granulated. Examples of methods for granulating powders includes: a method of adding a binder, kneading and granulating by sieving through a mesh screen; a method using a commercially available granulating machine by a spray-dry, etc. As the binder, polyvinyl alcohol binder, wax binder, acrylic binder or the like can be used. Furthermore, the additive amount of the binder is preferably in the range from 1 to 15 weight % with respect to the powder. Furthermore, the hole diameter of the mesh is preferably in the range from 100 to 1000 $\mu$m.

Then, the granulated powders are press-molded. As the method for press-molding, uniaxial press molding with a mold, isostatic molding or the like are preferred. The molding pressure is preferably in the range from 100 to 2000 kg/cm². The obtained molded body is thermally treated in an oxidizing atmosphere, for example, in the air at 350 to 800° C. to remove the binder components, followed by further burning at 800 to 1700° C. The burning atmosphere is not particularly limited, and thus may be a neutral atmosphere or oxidizing atmosphere.

The above-described method can provide a dielectric ceramic composition in the form of a sintered body. The dielectric ceramic compositions are formed into various kinds of devices for communication apparatus by appropriate combination with metallic conductors by conventional methods.

Figure 2:
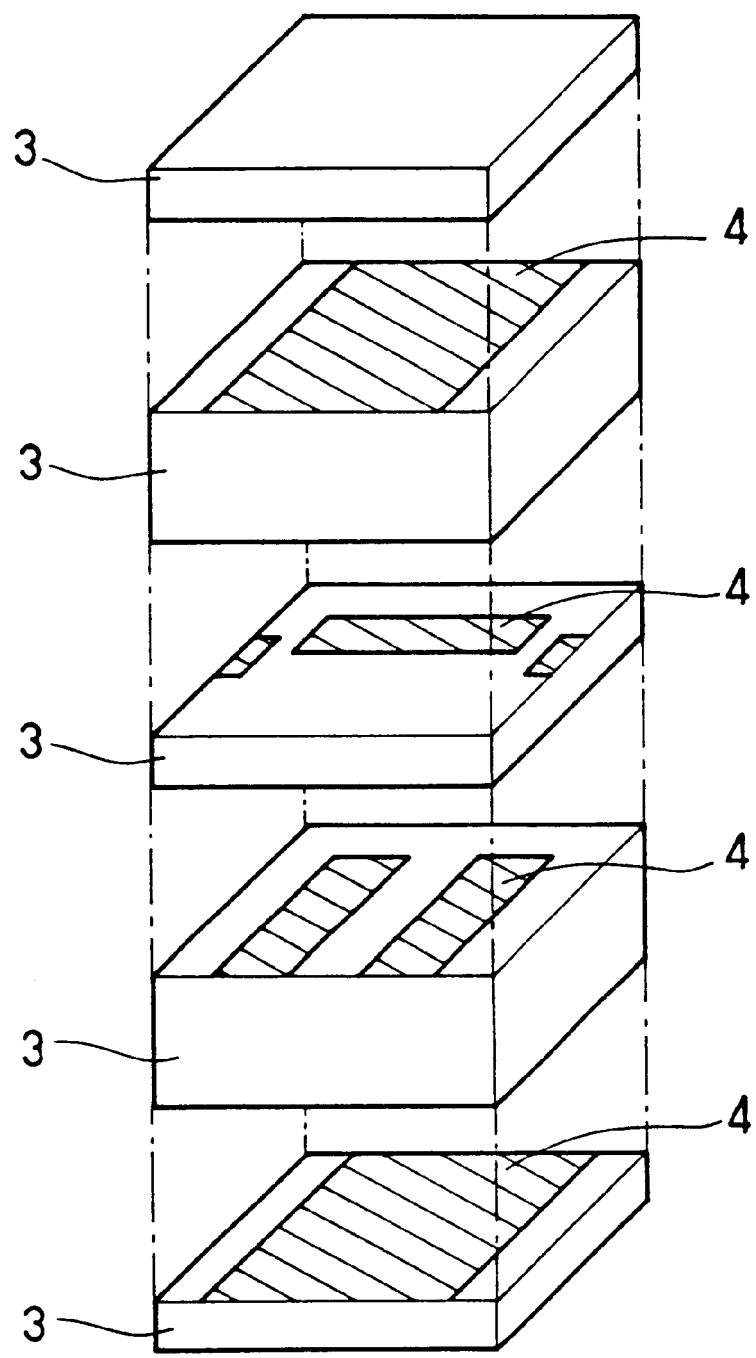
FIG. 2 is a view showing an internal structure in one example of a device for communication apparatus of the present invention.

Hereinafter, as one example of the device for communication apparatus of the present invention, a laminated bandpass filter will be explained. As shown in FIG. 2, the laminated bandpass filter 1 is produced by laminating the dielectrics 3 provided with internal electrodes 4 and comprising the dielectric ceramic composition of the present invention. Furthermore, as shown in FIG. 1, the outside of the bandpass filter 1 is provided with terminal electrodes 2. This laminated bandpass filter is advantageous for miniaturization of apparatus. For example, it is suitable for portable phone. In addition, the dielectric ceramic composition of the present invention is excellent in temperature property. It also is expected to be applied to a high damping device in a narrow band such as a bandpass filter.

EXAMPLE

Hereinafter, the present invention will be explained in detail by way of Examples.

Moreover, in the following Examples, properties were evaluated in terms of the dielectric constant, the dielectric loss (Q value) and the temperature coefficient at resonance frequency (TCF). The dielectric constant and the dielectric loss (Q value) were determined by a dielectric resonator method by using a network analyzer. The resonance frequency at this time was 3 to 10 GHz. Moreover, the TCF was calculated by a least square method by measuring the resonance frequency at temperatures from 85° C. to −25° C. when the sintered body is placed in an inverter cavity.

Example 1

$Al_2O_3$, MgO, $La_2O_3$, $CeO_2$, $Pr_6O_{11}$, $Nd_2O_3$, $Sm_2O_3$ and $Gd_2O_3$ were used as the starting materials. These starting materials were appropriately blended so that x, y and z were in the values given in Table 1 when these materials were expressed by the composition formula: $xAlO_{3/2}$—yMgO—$zRO_n$ (R: La, Ce, Pr, Nd, Sm, Eu, Gd and Tb).

These materials were blended so that a total amount was 100 g, placed in a 600 cc polyethylene pot with 130 cc of pure water and 600 g of zirconia balls of 10 mm in diameter, mixed by rotating thereof for 18 hours and ground. The slurry mixture was placed in a metallic bat and dried at 150° C. The dried mixture was placed in an alumina melting pot, lidded and calcined at 1450° C. for 4 hours. The calcined body was ground by the same method as in the mixing, and dried. Six weight % of polyvinyl alcohol binder was added to the obtained dielectric material powder, kneaded, and granulated by sieving though a mesh having a hole diameter of 500 $\mu$m. The granulated powders were filled in a mold and molded by the uniaxis press-molding method at a re of 1000 kg/cm². This press-molded body was retained in the air at 650° C. for 2 hours to remove the binder components, and then burned at a temperature in the range from 1500 to 1700° C. The size of the sintered body was about 11 mm in diameter and about 5 mm in height. The sintered body obtained by burning at various temperatures within the above range, and having the maximum density was evaluated for the dielectric property by the above-described method.

TABLE 1

| No. | R | x | y | z | $\xi_r$ | Qf [× 10³ GHz] | TCF [ppm/° C.] |
|---|---|---|---|---|---|---|---|
| 1# | La | 92 | 8 | 0 | 10 | 141 | −62 |
| 2 | La | 91.5 | 8 | 0.5 | 11 | 60 | −50 |
| 3# | La | 91.7 | 0 | 8.3 | 12 | 27 | −65 |
| 4 | La | 83.7 | 8 | 8.3 | 14 | 12 | 14 |
| 5 | La | 72 | 26 | 2 | 10 | 22 | −32 |
| 6 | La | 62 | 2 | 36 | 21 | 14 | −45 |
| 7# | La | 54 | 26 | 20 | | Not sintering | |
| 8 | Nd | 90 | 8 | 2 | 12 | 51 | −20 |
| 9 | Nd | 72 | 26 | 2 | 10 | 31 | −31 |
| 10# | Nd | 54 | 26 | 20 | | Not sintering | |
| 11 | Sm | 90 | 8 | 2 | 12 | 36 | −3 |
| 12 | Sm | 72 | 26 | 2 | 10 | 27 | −11 |
| 13# | Sm | 54 | 26 | 20 | | Not sintering | |
| 14 | Ce | 90 | 8 | 2 | 11 | 27 | −35 |
| 15 | Pr | 90 | 8 | 2 | 12 | 21 | −26 |
| 16 | Gd | 90 | 8 | 2 | 12 | 29 | 1 |

The samples from Nos. 1 to 16 in Table 1, except the samples marked with # (i.e. Nos. 1, 3, 7, 10 and 13), show excellent properties. In other words, the dielectric constant was around 12 in most of the samples, the Qf product (a product of Q value and resonance frequency) was so high as 10000 GHz or more, and the TCF was −60 ppm/° C. or more (the absolute value was 60 ppm/° C. or less). Thus, the dielectric ceramic composition using the oxides expressed by the composition formula achieved a low dielectric constant of 8 to 25 and a practical level of the Qf product and TCF.

Example 2

A dielectric powder was obtained by the same method as in Example 1. The composition of the dielectric powder was expressed by the composition formula: $90Al_2O_3$—$8MgO$—$2RO_n$. R was selected from the elements shown in Table 3.

Next, glass powders were produced by the following method. $SiO_2$, $B_2O_3$, $Al_2O_3$, $CaCO_3$, $SrCO_3$, $BaCO_3$, $La_2O_3$, $ZrO_2$, $TiO_2$, $MgO$, $PbO$, $ZnO$, $Li_2CO_3$, $Na_2CO_3$ and $K_2CO_3$ were used as the starting materials. These starting materials were appropriately selected and blended so that the total amount was 60 g and the proportion was in the ranges as shown in Table 2. These materials were placed in a 600 cc polyethylene pot with 130 cc of ethanol and 600 g of zirconia balls of 10 mm in diameter, mixed by rotating thereof for 18 hours and ground. The slurry mixture was placed in a metallic bat and dried at 150° C. The dried mixture was placed in a platinum melting pot, lidded, and melted at 1300° C. Thereafter, the molten body was quenched by placing it in water. The obtained glass was ground by the same method as mixing, and dried. Thus, glass powder was obtained.

The dielectric powder (a first component) and the glass powder (a second component) were blended in a total amount of 80 g at the predetermined ratio, mixed by the same method as the mixing of the glass powders, and dried. The obtained powder mixture was formed into a sintered body by the same method as in Example 1. Then, the property of the sintered body was evaluated. The sintering temperature was in the range from 800 to 1100° C. The composition and state of the obtained glass are shown in Table 2 and the composition and properties of the obtained sintered body are shown in Table 3, respectively.

TABLE 2

| | $SiO_2$ | $B_2O_3$ | $Al_2O_3$ | CaO | SrO | BaO | $La_2O_3$ | $ZrO_2$ | Other materials | State of glass |
|---|---|---|---|---|---|---|---|---|---|---|
| A | 50 | | | | | 20 | | | PbO 20<br>$Li_2O$ 10 | Good |
| B | 50 | 30 | | | 20 | | | | $TiO_2$ 5<br>$Li_2O$ 5 | Good |
| C | 45 | 25 | | 10 | | | | | MgO 5<br>$Na_2O$ 5 | Good |
| D | 45 | 25 | | 10 | | | | | PbO 5<br>$K_2O$ 5 | Good |
| E | 45 | 25 | | 10 | | | | | ZnO 5<br>$Li_2O$ 5 | Good |
| F | 45 | 25 | | 10 | | | | | | Good |
| G | 50 | 20 | 10 | | 20 | | | | | Good |
| H | 50 | 20 | 10 | 10 | | 10 | | | | Good |
| I | 10 | 30 | 30 | | | 30 | | | | Glass was not formed |
| J | 80 | 10 | 5 | | | 5 | | | | Not melted |
| K | 30 | 45 | 10 | | | 15 | | | | Hygroscopic |
| L | 35 | 10 | 45 | | | 10 | | | | Good |
| M | 25 | 10 | 5 | | | 60 | | | | Not melted |
| N | 45 | 5 | 5 | | | 35 | 10 | | | Good |
| O | 45 | 5 | 5 | 15 | 20 | 10 | | | | Good |
| P | 45 | 5 | 10 | | | 40 | | | | Good |
| Q | 35 | 5 | 5 | | | 35 | 20 | | | Good |
| R | 47 | 20 | 15 | 10 | | | 8 | | | Good |
| S | 48 | 22 | 18 | 12 | | | | | | Good |
| T | 40 | 18 | 15 | 10 | | | | 17 | | Good |

TABLE 3

| No. | R in first component | Kind of second component | Amount of second component (wt. %) | Sintering temperature (° C.) | $\xi_r$ | Qf [GHz] | TCF [ppm/° C.] |
|---|---|---|---|---|---|---|---|
| 17 | La | A | 40 | 1050 | 8 | 3000 | −40 |
| 18 | Nd | A | 40 | 1050 | 7 | 3000 | −10 |
| 19 | Sm | B | 40 | 1050 | 7 | 4000 | −2 |
| 20# | Sm | B | 80 | 900 | Not measurable. | | |

TABLE 3-continued

| No. | R in first component | Kind of second component | Amount of second component (wt. %) | Sintering temperature (° C.) | $\xi_r$ | Qf [GHz] | TCF [ppm/° C.] |
|---|---|---|---|---|---|---|---|
| 21 | Sm | C | 40 | 1000 | 7 | 4000 | −3 |
| 22 | Sm | D | 40 | 950 | 6 | 4000 | −1 |
| 23 | Nd | E | 40 | 900 | 8 | 3000 | −12 |
| 24 | Nd | F | 40 | 900 | 7 | 4000 | −9 |
| 25 | La | G | 40 | 1000 | 8 | 4000 | −40 |
| 26 | Sm | H | 40 | 950 | 7 | 4000 | −4 |
| 27# | Sm | H | 80 | 850 | Not measurable. | | |
| 28# | Sm | J | 60 | 1050 | — | — | — |
| 29 | Nd | N | 40 | 950 | 7 | 6000 | −10 |
| 30 | Nd | O | 40 | 950 | 7 | 7000 | −11 |
| 31 | La | O | 40 | 950 | 8 | 6000 | −38 |
| 32## | Nd | P | 40 | 1000 | 8 | 3000 | −11 |
| 33## | Nd | Q | 20 | 900 | 7 | 3000 | −12 |
| 34 | Ce | R | 40 | 900 | 6 | 3000 | −22 |
| 35 | Pr | R | 40 | 900 | 7 | 4000 | −13 |
| 36 | Gd | R | 40 | 900 | 7 | 4000 | 2 |
| 37 | Sm | R | 40 | 900 | 7 | 3000 | −5 |
| 38## | Sm | S | 40 | 1000 | 8 | 4000 | −3 |
| 39## | Sm | T | 40 | 1000 | 7 | 3000 | −8 |

The first component: $90AlO_{3/2}$—$8MgO$—$2RO_{3/2}$

In the samples Nos. 17 to 39 shown in Table 3, the samples in which more than 70 weight % of glass compositions was added (i.e. the samples Nos. 20 and 27) had a small Qf product and the dielectric property was not measurable. Moreover, in the sample No. 28, the second component itself was not melted and the glass composition could not be obtained. On the other hand, the other dielectric ceramic compositions were sintered at a low temperature of 1100° C. or less, showing an excellent property: the dielectric constant of 6 to 8, the Qf product of 3000 GHz or more and TCF value of more than −50ppm/° C. (i.e. an absolute value of 50ppm/° C. or less). Thus, in the dielectric ceramic compositions in which glass compositions were added to the oxide expressed by the composition formula in an amount of 70 weight % or less, the low dielectric constant of 5 to 11 and the practical level of Qf value and TCF were achieved.

Furthermore, the dielectric ceramic compositions, except for the samples Nos. 17 to 19, having such excellent properties could be sintered at a temperature of 1000° C. or less. In particular, the samples Nos. 34 to 37 using the glass composition belonging to the composition III comprising $ZrO_2$ could be sintered at low temperature of 950° C. or less. However, when the amount of $ZrO_2$ was less than 0.5 weight % or more than 13 weight %, the composition could not be sintered at 950° C. or less (the samples Nos. 38 and 39 marked with ##).

Furthermore, the samples Nos. 29 to 31 using the glass composition belonging to the composition II comprising $La_2O_3$ showed a high Qf product of 5000 GHz or more. However, as is apparent from the samples Nos. 32 and 33 marked with ##, when the amount of $La_2O_3$ is less than 5 weight % or more than 15 weight %, the Qf product of 5000 GHz or more could not be obtained.

Furthermore, the preferable range of the other materials forming the compositions that are added as the second component follows. That is, as is apparent from the compositions I to M, when the amount of $SiO_2$ was less than 20 weight %, the compositions were not formed into glass. On the other hand, when the amount of $SiO_2$ was more than 70 weight %, the compositions were not easily melted. When the amount of $B_2O_3$ was more than 35 weight %, the hygroscopic property was excessively increased. When the amount of $Al_2O_3$ was more than 35 weight %, glass was obtained, but the sintered body attached to the sheath. Furthermore, when the amount of MO was more than 50 weight %, the composition was not easily melted.

Furthermore, when generated phases of the sintered body of the present invention were analyzed by the use of X-ray diffraction, a magneto-plumbite phase, a corundum phase, a spinel phase and a glass phase were detected. The magneto-plumbite phase was generally expressed by $PO.6Q_2O_3$ (P denotes a bivalent ion, and Q denotes a trivalent ion). The composition of the present invention comprises $Al_2O_3$ as the $Q_2O_3$. In general, when the dielectric constant is low, the TCF has a large negative number. However, in this case, due to the presence of the magneto-plumbite phase, the absolute value of the TCF is small.

The dielectric powders produced in the above-mentioned Examples were formed into a green sheet, printed with Ag, compressed, cut into individual pieces and burned. Consequently, a laminate having an excellent property was obtained. Thus, the dielectric ceramic composition of the present invention can be used as a device having a laminated structure in which a layer comprising metals such as Ag, Au, Cu, Pd, etc., is laminated to the dielectric ceramic composition. Furthermore, as is apparent from the Examples, each of the dielectric compositions can be used as a high-frequency device that exhibits excellent properties, particularly in a GHz band that is the band for evaluating properties, by appropriately combining the metals.

Moreover, according to the above-mentioned methods, elements such as Zr, Ti, Si, Fe, Ca, etc. may be present as contaminants during the production process, or may be contained in the starting materials. However, such impurities are allowed to be present as long as the object of the present invention can be achieved. However, the total concentration of the impurities is preferably 0.2 weight % or less based on the oxide.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A dielectric ceramic composition comprising:
$Al_2O_3$, MgO and $RO_n$, expressed by a composition formula;

$xAlO_{3/2}$—$yMgO$—$zRO_n$, wherein $x \geq 55$, $y \geq 0.5$, $z \geq 0.5$, $x+y+z=100$, R is at least one element selected from the group consisting of La, Ce, Pr, Nd, Sm, Eu, Gd and Tb, and n is a value stoichiometrically determined in accordance with the valence of said R; and
a glass composition comprising at least one selected from the group consisting of $SiO_2$ and $B_2O_3$ as a second component in an amount of 70 weight % or less.

2. The dielectric ceramic composition according to claim 1, wherein said second component further comprises at least one oxide selected from the group consisting of $Al_2O_3$, $ZrO_2$, $TiO_2$, BaO, SrO, CaO, MgO, $La_2O_3$, PbO, ZnO, $Li_2O$, $Na_2O$ and $K_2O$.

3. The dielectric ceramic composition according to claim 2, wherein said second component comprises 20 to 70 weight % of $SiO_2$, 0 to 35 weight % of $B_2O_3$, 1 to 35 weight % of $Al_2O_3$ and 0 to 50 weight % of MO, wherein M is at least one element selected from the group consisting of Ca, Sr and Ba.

4. The dielectric ceramic composition according to claim 2, wherein said second component comprises 30 to 60 weight % of $SiO_2$, 2 to 8 weight % of $B_2O_3$, 2 to 10 weight % of $Al_2O_3$, 20 to 50 weight % of MO and 5 to 15 weight % of $La_2O_3$, wherein M is one element selected from the group consisting of Ca, Sr and Ba.

5. The dielectric ceramic composition according to claim 2, wherein said second component comprises 30 to 70 weight % of $SiO_2$, 10 to 35 weight % of $B_2O_3$, 5 to 30 weight % of $Al_2O_3$ and 2 to 15 weight % of MO and 0.5 to 13 weight % of $ZrO_2$, wherein M is at least one element selected from the group consisting of Ca, Sr and Ba.

6. The dielectric ceramic composition according to claim 1, wherein R is at least one element selected from the group consisting of La, Nd and Sm.

7. The dielectric ceramic composition according to claim 1, wherein the dielectric ceramic composition includes a crystalline phase comprising said first component and a glass phase comprising said second component.

8. The dielectric ceramic composition according to claim 7, wherein said crystal phase comprises a magneto-plumbite phase, and said magneto-plumbite phase comprises $Al_2O_3$.

9. The dielectric ceramic composition according to claim 8, wherein said crystal phase comprises at least one phase selected from the group consisting of a corundum phase, a spinel phase, a trydimite phase, a cristobalite phase and a perovskite phase.

10. A dielectric ceramic composition comprising $Al_2O_3$, MgO and $RO_n$, wherein R is at least one element selected from the group consisting of La, Ce, Pr, Nd, Sm, Eu, Gd, and Tb and n is a value stoichiometrically decided in accordance with the valence of said R, wherein said dielectric ceramic composition comprises a crystal phase and a glass phase, wherein said crystal phase includes a magneto-plumbite phase expressed by $PO·6Q_2O_3$, wherein P is a bivalent ion including Mg and Q is a trivalent ion including Al and R.

11. The dielectric ceramic composition according to claim 10, wherein said crystal phase further comprises at least one phase selected from the group consisting of a corundum phase, a spinel phase, a trydimite phase, a cristobalite phase and a perovskite phase.

12. The dielectric ceramic composition according to claim 10, wherein the dielectric ceramic composition further includes at least one selected from the group consisting of $SiO_2$ and $B_2O_3$.

13. A device for a communication apparatus comprising a dielectric ceramic composition comprising $Al_2O_3$, MgO and $RO_n$, wherein R is at least one element selected from the group consisting of La, Ce, Pr, Nd, Sm, Eu, Gd, and Tb and n is a value stoichiometrically decided in accordance with the valence of said R, wherein said dielectric ceramic composition comprises a crystal phase and a glass phase, wherein said crystal phase includes a magneto-plumbite phase expressed by $PO·6Q_2O_3$, wherein P is a bivalent ion including Mg and Q is a trivalent ion including Al and R.

14. A device for a communication apparatus comprising a laminate, the laminate comprising:
a dielectric layer comprising a ceramic composition comprising $Al_2O_3$, MgO and $RO_n$, wherein R is at least one element selected from the group consisting of La, Ce, Pr, Nd, Sm, Eu, Gd, and Tb and n is a value stoichiometrically decided in accordance with the valence of said R, wherein said dielectric ceramic composition comprises a crystal phase and a glass phase, wherein said crystal phase includes a magneto-plumbite phase expressed by $PO·6Q_2O_3$, wherein P is a bivalent ion including Mg and Q is a trivalent ion including Al and R; and
a conductive layer including at least one metal selected from the group consisting of Ag, Au, Cu and Pd as a main component.

15. A dielectric ceramic composition comprising:
$Al_2O_3$, MgO and $RO_n$ expressed by a composition formula:

$$xAlO_{3/2} - yMgO - zRO_n,$$

wherein x is greater or equal to 55, y is greater or equal to 0.5, z is between 1.5 and 35.0, x plus y plus z equals 100, R is at least one element selected from the group consisting of La, Ce, Pr, Nd, Sm, Eu, Gd and Tb, and n is a value stoichiometrically determined in accordance with the valence of said R.

16. The dielectric ceramic composition according to claim 15, wherein R is at least one element selected from the group consisting of La, Nd and Sm.

17. A device for a communication apparatus comprising a dielectric ceramic composition comprising $Al_2O_3$, MgO and $RO_n$ expressed by a composition formula:

$$xAlO_{3/2} - yMgO - zRO_n,$$

wherein x is greater or equal to 55. y is greater or equal to 0.5. z is between 1.5 and 35.0, x plus y plus z equals 100, R is at least one element selected from the group consisting of La. Ce. Pr, Nd, Sm, Eu, Gd, and Tb, and n is a value stoichiometrically determined in accordance with the valence of said R.

18. A device for a communication apparatus comprising a laminate, the laminate comprising:
a dielectric layer including a ceramic composition comprising $Al_2O_3$, MgO and $RO_n$ expressed by a composition formula:

$$xAlO_{3/2} - yMgO - zRO_n,$$

wherein x is greater or equal to 55, y is greater or equal to 0.5, z is between 1.5 and 35.0, x plus y plus z equals 100, R is at least one element selected from the group consisting of La, Ce, Pr, Nd, Sm, Eu, Gd, and Tb, and n is a value stoichiometrically determined in accordance with the valence of said R.

* * * * *